United States Patent

[11] 3,591,265

[72] Inventor Frank B. Shropshire
1623 Josselyn Canyon Road, Monterey, Calif. 93940
[21] Appl. No. 722,316
[22] Filed Apr. 18, 1968
[45] Patented July 6, 1971

[54] AUDIO-VISUAL PROJECTION DEVICE
4 Claims, 18 Drawing Figs.
[52] U.S. Cl. .................................................. 352/17, 352/169, 352/192
[51] Int. Cl. ............................................... G03b 31/00
[50] Field of Search ........................................... 352/137, 169, 191, 192, 193, 15, 16, 17, 22, 24

[56] References Cited
UNITED STATES PATENTS

| | | | |
|---|---|---|---|
| 1,165,513 | 12/1915 | Kamm | 352/147 |
| 2,503,083 | 4/1950 | Waller | 352/17 |
| 2,606,476 | 8/1952 | Waller | 352/17 |
| 3,081,013 | 3/1963 | Walther | 226/64 X |
| 3,432,228 | 3/1969 | Hellmund | 352/137 X |
| 2,371,836 | 3/1945 | Masterson | 352/192 |
| 3,196,454 | 7/1965 | Fine | 352/5 |
| 3,397,937 | 8/1968 | Schrader | 352/169 |

FOREIGN PATENTS

| 691,472 | 5/1953 | Great Britain | 352/24 |
|---|---|---|---|

Primary Examiner—Samuel S. Matthews
Assistant Examiner—Monroe H. Hayes
Attorney—Henry Gifford Hardy ABSTRACT: Apparatus for projecting film frames in customary rapid motion picture sequence or a single film frame for a protracted period without the viewers discerning the difference. A film advancing claw operates in synchronization with a continuously running shutter but is moved in and out of engagement with the film in response to signal producing pulses preferably located on a magnetic tape which serves also as the soundtrack on a parallel track, for the film. During scenes not involving motion the claw is disengaged from the film and the same film frame is repeatedly projected. Continued rotation of the shutter maintains the same level of illumination, cooling and the illusion that a "moving" picture is being viewed.

PATENTED JUL 6 1971

INVENTOR.
FRANK B. SHROPSHIRE
BY
ATTORNEY

INVENTOR.
FRANK B. SHROPSHIRE
BY
ATTORNEY

INVENTOR.
FRANK B. SHROPSHIRE
BY Henry Gifford Hardy
ATTORNEY

INVENTOR.
FRANK B. SHROPSHIRE
BY
ATTORNEY

AUDIO-VISUAL PROJECTION DEVICE

The invention relates to audiovisual projection devices employing a sound-track and photographic film and method of synchronization and, more particularly, to novel means for synchronizing the soundtrack with the film and for selectively projecting either a plurality of film frames in motion picture sequence or as a single frame for a protracted period without losing the effect of a motion picture projection.

In all motion pictures there is a large percentage of scenes in which no motion occurs. This is particularly true in training, instructional and educational films. In an 8 to 10 minute film projection—particularly a lesson—less than 30 percent of the film, on the average, will actually portray scenes in motion. The remainder of the projection will consist of scenes without motion, during these scenes the projector will project multiple sequential frames of the same scene onto the screen. If means can be found to eliminate the costly duplication of scenes in those portions of the film not involving motion, the average length and, hence the cost, of training films can be reduced very substantially.

Accordingly, the present invention has for its object an audiovisual projection device capable of selectively projecting either a plurality of film frames in rapid sequence during those portions of the film involving motion or a single frame for a protracted period during those portions of the film not involving motion and in such a way that the viewer is unaware of any change in the manner in which the film is being projected.

Another object of the invention is an audiovisual projection device with an improved sound system and improved means for synchronizing the sound system with the film projection.

Further objects are to provide a construction of maximum simplicity, economy and ease of assembly and disassembly, also such further objects, advantages and capabilities as will fully appear and as are inherently possessed by the device and invention described herein, without any attempt to give them fully and in detail.

The invention further resides in the combination, construction and arrangement of parts illustrated in the accompanying drawings, and while there is shown therein the two presently preferred embodiments thereof, it is to be understood that the same is illustrative of the invention and that the invention is capable of modification and change and comprehends other details of construction without departing from the spirit thereof or the scope of the appended claims.

Figure 1:
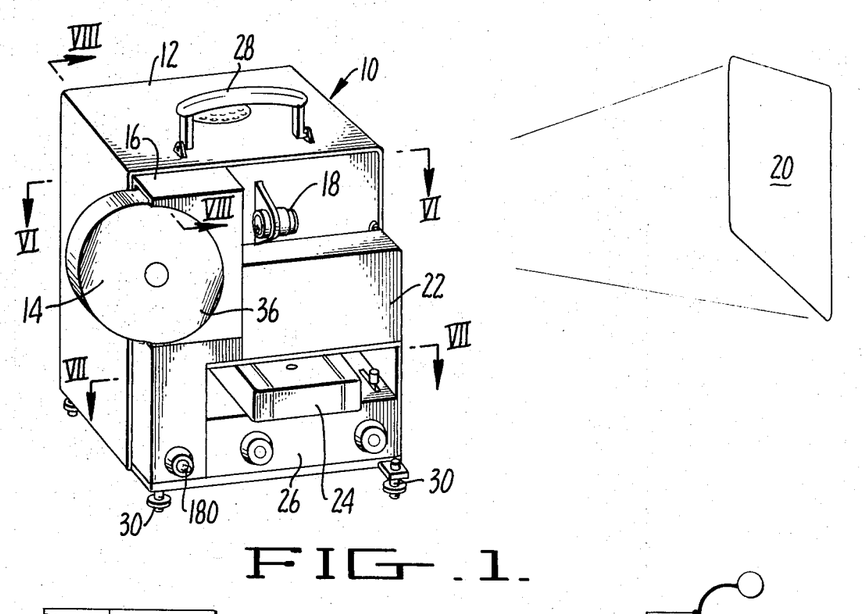
FIG. 1 is an external perspective view of an audiovisual projection device constructed in accordance with teachings of the invention.
Figure 2:
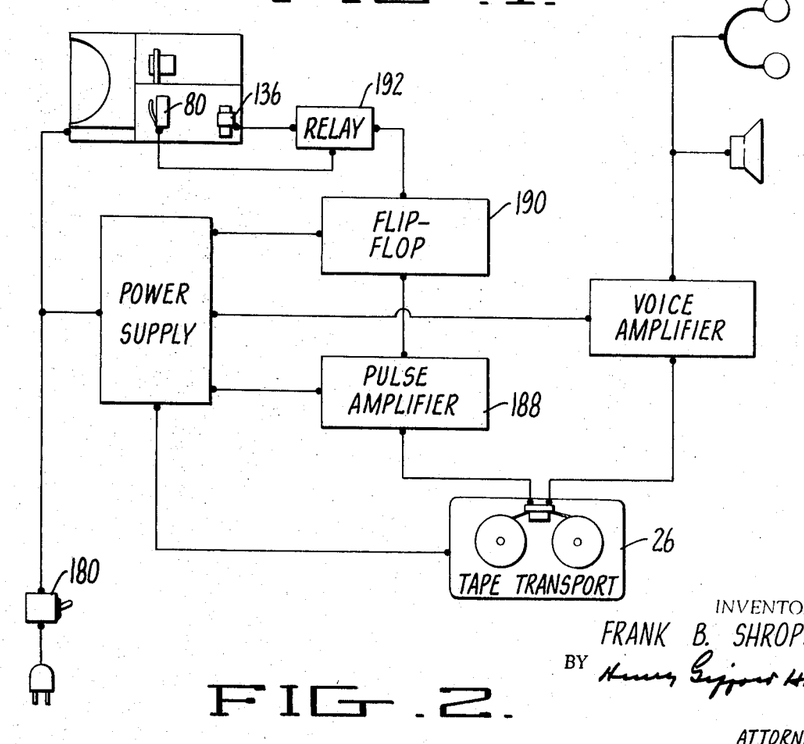
FIG. 2 is a schematic diagram showing the electrical interconnections of the parts making up the projection device of FIG. 1.

Referring first to FIG. 1 there is shown an audiovisual projection device 10 constructed in accordance with the teachings of the invention. The projection device comprises, in general, the following component parts: a main housing 12 enclosing a projection lamp, condenser and heat lenses, a speaker and the motor which drives the shutter and the film advancing mechanism; a film cartridge 14 which is inserted into a cartridge housing 16,; a lens system 18 for focusing the film onto a screen 20 spaced from the device 10; a housing 22 for the film advancing mechanism; a two-track magnetic tape cartridge 24 which carries the audible part of the subject on one track and pulses for advancing the film on the other; a tape transport 26 for playing the magnetic tape, and electronic pickup for the pulses. As is customary, the projection device 10 is provided with carrying means in the form of a handle 28 and with adjusting screws 30 at the bottom thereof by means of which the inclination and leveling of the device may be adjusted.

Figures 3, 4, 5:
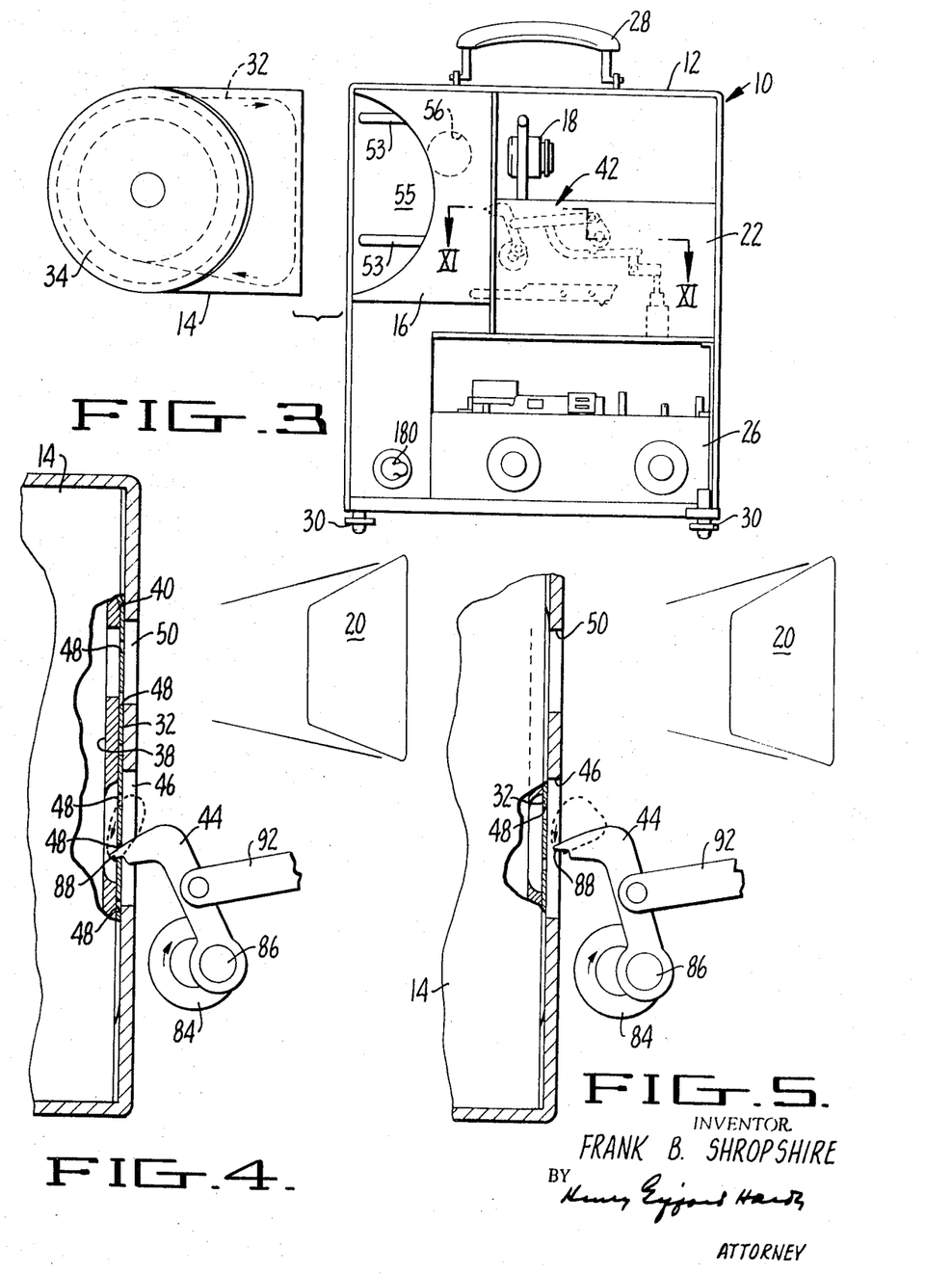
FIG. 3 is a side view in elevation of the projection device shown in FIG. 1 showing the relationship of the removable film cartridge to the projection device.
FIG. 4 is an enlarged partial view, partly in section, showing the interrelationship between the film in the cartridge and the film advancing claw, the film advancing claw being shown engaged with the film at approximately the bottom of its film transporting stroke.
FIG. 5 is a view similar to FIG. 4 showing the film advancing claw at a point in its downward stroke but disengaged from the film.
Figures 6, 8:
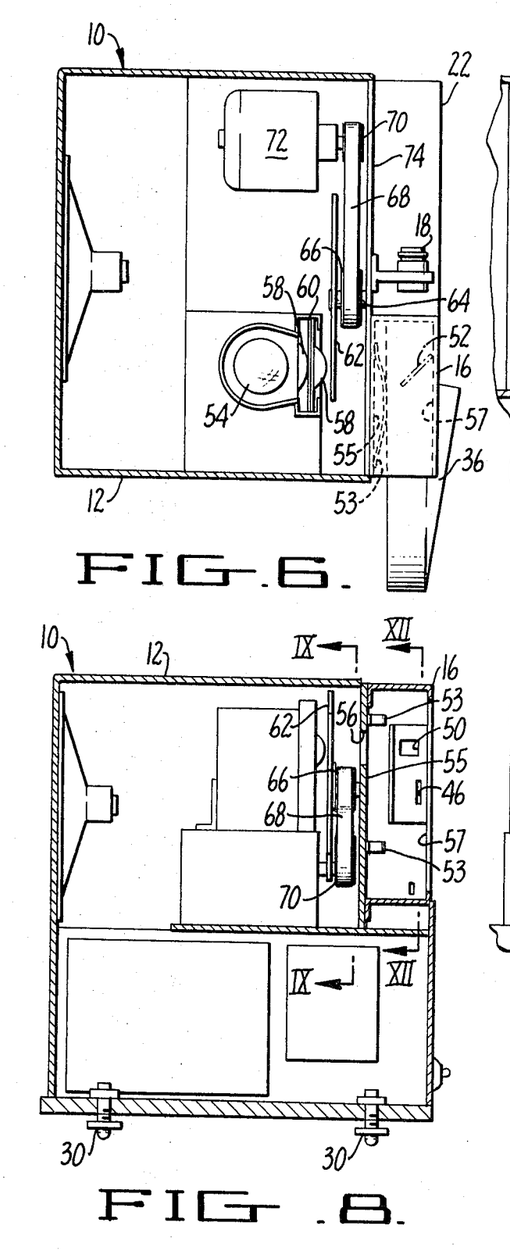
FIG. 6 is a plan view, partly in section, taken along the line VI-VI in FIG. 1 looking in the direction of the arrows.
FIG. 8 is a view, partly in section, taken along the line VIII-VIII in FIG. 1 looking in the direction of the arrow.
Figure 7:
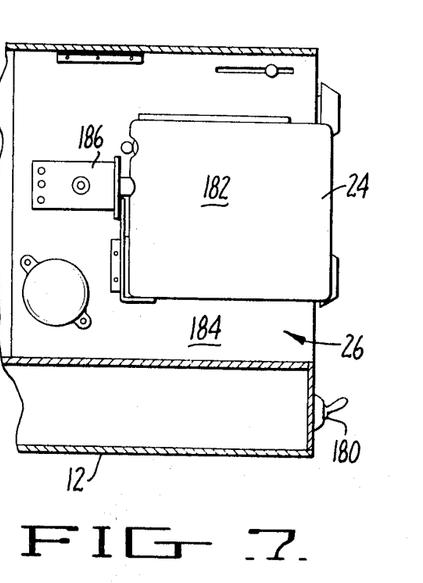
FIG. 7 is a plan view, partly in section, taken along the line VII-VII in FIG. 1 looking in the direction of the arrows.
Figure 9:
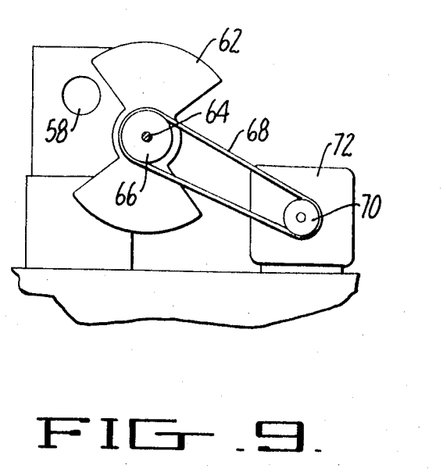
FIG. 9 is a partial view taken along the line IX-IX in FIG. 8 looking in the direction of the arrows.

THe projection device shown in the drawings is adapted to be used in conjunction with a film cartridge. The film cartridge 14 is intended to be a self-contained component carrying the film with the required frames comprising the visual content of the subject. Unlike the customary motion picture film which has two free ends where the beginning end is wound onto a receiving reel, the film 32 in the cartridge 14 (see FIG. 3) is arranged in an endless loop with the major portion 34 of the film loop disposed within a generally circular chamber section 36 that is slightly angled or canted with respect to the plane of the cartridge 14. The copending case Ser. No. 722,443, discloses and claims a film cartridge suitable for this purpose. The film 32 is taken off the outer periphery of the loop and passed through a film track 38 located at the back of the front face 40 of the cartridge 14. From the film track 38 the film 32 is returned to the loop by feeding it into the inner periphery of the loop. Movement of the film 32 in the cartridge 14 is effected by a film advancing mechanism 42 located on the projection device. A film advancing claw 44 engages the perforations of the film 32 while it is in the film track 38 of the cartridge 14 whenever it extends through a longitudinal slot 46 formed in the front face 40 of the cartridge. When the claw 44 engages the perforations 48 in the film 32 it pulls the film downwardly one frame at a time. As the film 32 moves through the film track 38 it passes a projection aperture 50 in the front face of the cartridge which is in alignment with the lens system 18 of the projection device. The film cartridge 14 is provided internally with a mirror element 52 which makes a 450 angle with respect to the axis of the lens system 18 on the projection device and with the axis of the projection lamp 54 (see FIG. 6). As light from the projection lamp 54 is projected onto the mirror 52 through an opening 56 in the outer wall 55 of the housing 12 it is deflected through the film 32, the projection aperture 50 and the lens system 18 onto the screen 20. Proper alignment of the cartridge is effected by a pair of bar springs 53 positioned on the outer wall 55 of the housing 12. THe pressure of the springs 53 forces the cartridge casing into engagement with the outer wall 57 of the cartridge housing 16 where it is in proper alignment with the focusing lens 18 and the opening 56.

The use of a film cartridge is preferred over the customary reel of film because it permits each individual film for the particular subject of portion thereof to be inserted into the projection device without requiring the threading of the film through the projector's film advancing mechanism,. This permits the projection device to be used easily and readily since it is not necessary to instruct the user of the device how to thread the film through the projector. It also insures proper alignment of the film subject with the corresponding audio portion as will be described more fully hereinafter. It is to be understood, however, that the use of the film cartridge is optional through much preferred, and that the invention may also be used in film projectors in which the film is unwound from one reel onto another.

The projection lamp 54 for the projection device 10 is located within the housing 12 and is provided with light concentrating lenses 58 and a heat shield 60 in any suitable manner well known in the art. It is necessary to provide sufficient heat resistance between the projection lamp 54 and the film 32 to prevent overheating or burning of the film during the protracted periods when a single frame is stopped in front of the projection aperture 50 and projected onto the screen 20. The projection lamp 54 is also provided with a rotating shutter 62 which, in the form of the invention shown in the drawings, comprises a double-leafed, disc-type shutter. The shutter 62 is mounted on a shaft 64 which is driven by means of a pulley 66 and belt 68 from the drive pulley 70 of a synchronous motor 72. Rotation of the shutter 62 at constant speed continuously interrupts the light from the projection lamp 54. Interruption of light source serves a triple function in the present invention. It provides a momentary blacked-out period on the screen during which the next succeeding frame on the film may be advanced to a projecting same function which continuous rotation of the shutter serves in the case of the usual motion picture projector where the film is continuously advanced even during those scenes where no motion occurs in the action depicted by the film. It also serves the additional and very important function of continuing the optical illusion of a motion picture during those periods when the film is not in motion and the same single film frame is being repeatedly projected onto the screen. The third function is that it acts to cool a single frame of film being held in the aperture both by the circulation of air and by the reduction of the constant heat of the light beam. No other still projection device does these things.

All motion pictures are optical illusions. Every motion picture actually is a series of still pictures projected in rapid sequence. Due to the faculty of the human eye to retain an image on the retina for a fraction of a second after the projection of the picture has stopped, the illusion of motion is created. The continuous rotation of the shutter 62 during the repetitious projection of a single frame continues the illusion that the viewer is looking at a motion picture and not a still picture. Additionally, the continuous rotation of the shutter 62 has the additional function of providing equal illumination of each frame of the film regardless of whether that frame is being advanced in rapid sequence with other frames on the film or is being projected for a protracted period. If the shutter were not rotated during this period, as is frequently the case in devices for protecting still pictures, the amount of light passing through the frames of the film when the film is being projected in rapid sequence.

The film advancing mechanism 42 for the projection device is so constructed as to provide for the projection of successive frames of film in rapid motion picture sequence of a single frame for a protracted period of time. In general, the film advancing means 42 operates continuously in synchronization with the shutter 62 but means are provided for engaging and disengaging the film advancing mechanism in response to signal pulses on the magnetic tape. The signal pulses on the tape alternately actuate the film advancing mechanism to engage the film in the cartridge and to disengage the film in the cartridge. Accordingly, one pulse on the tape serves to engage the film advancing mechanism 42 with the film in the cartridge 14 causing the film 32 to be advanced in rapid sequence. The next pulse from the magnetic tape disengages the film advancing means 42 from the film 32 and leaves a single frame in front of the projection aperture 50 to be repeatedly projected onto the screen 20. The next succeeding pulse from the tape reengages the film advancing mechanism 42 with the film 32 and the film is again advanced in rapid sequence or merely one frame. The pulses spaced on the magnetic tape thereby determine whether the film will be projected in rapid sequence or stopped altogether so as to project the same single film frame for an extended period.

The shaft 64 passes through the outer wall 74 of the housing 12 and into the casing 22 for the film advancing mechanism 42. As will be best seen in FIG. 10 the shaft 64 has a cam 76 that engages a cam follower 78 mounted on a microswitch 80. The purpose of the microswitch 80 is to ground the relay circuit for the actuating solenoid in the film advancing mechanism 42 as will be described more fully hereinafter. The shaft 64 for the shutter 62 also passes through an intermediate wall 82 within the casing 22 for the film advancing mechanism 42 and terminates in a circular disc 84 which acts as a bellcrank. A stud shaft 86 is mounted eccentrically on the disc 84 so that rotation of the disc 84 drives the stud shaft 86 through a circular path. The location of the stud shaft 86 relative to the center of the shaft 64 for the shutter 62 is such as to provide the proper length of working stroke for the film advancing claw 44 that is pivotally mounted on the stud shaft 86. With the film advancing claw 44 in its film engaging position, the diameter of the circle traveled by the stud shaft 86 is such as to permit the point 88 of the claw 44 to engage and then advance the film 32 in the cartridge 14 through a distance equal to one film frame. Inasmuch as the stud shaft 86 is driven by the same shaft 64 which drives the shutter 62, the downward or working stroke of the film advancing claw is always synchronized with the shutter 62. The shutter 62 is positioned on the shaft 64 at the proper angle to insure that the working stroke of the claw 44 always occurs when the projection lamp 54 is blocked by a leaf of the shutter 62.

Advancement of the film 32 is controlled by selective engagement of the film advancing claw 44 with the film in the cartridge. Engagement and disengagement of the film advancing claw 44 occurs through slight pivotal movement of the film advancing claw 44 about the stud shaft 86. The general arrangement of the parts which effect this pivotal movement of the claw are shown in FIGS. 10 and 11, and the sequence of operation of the mechanism is illustrated in FIGS. 12—16.

Figure 10:
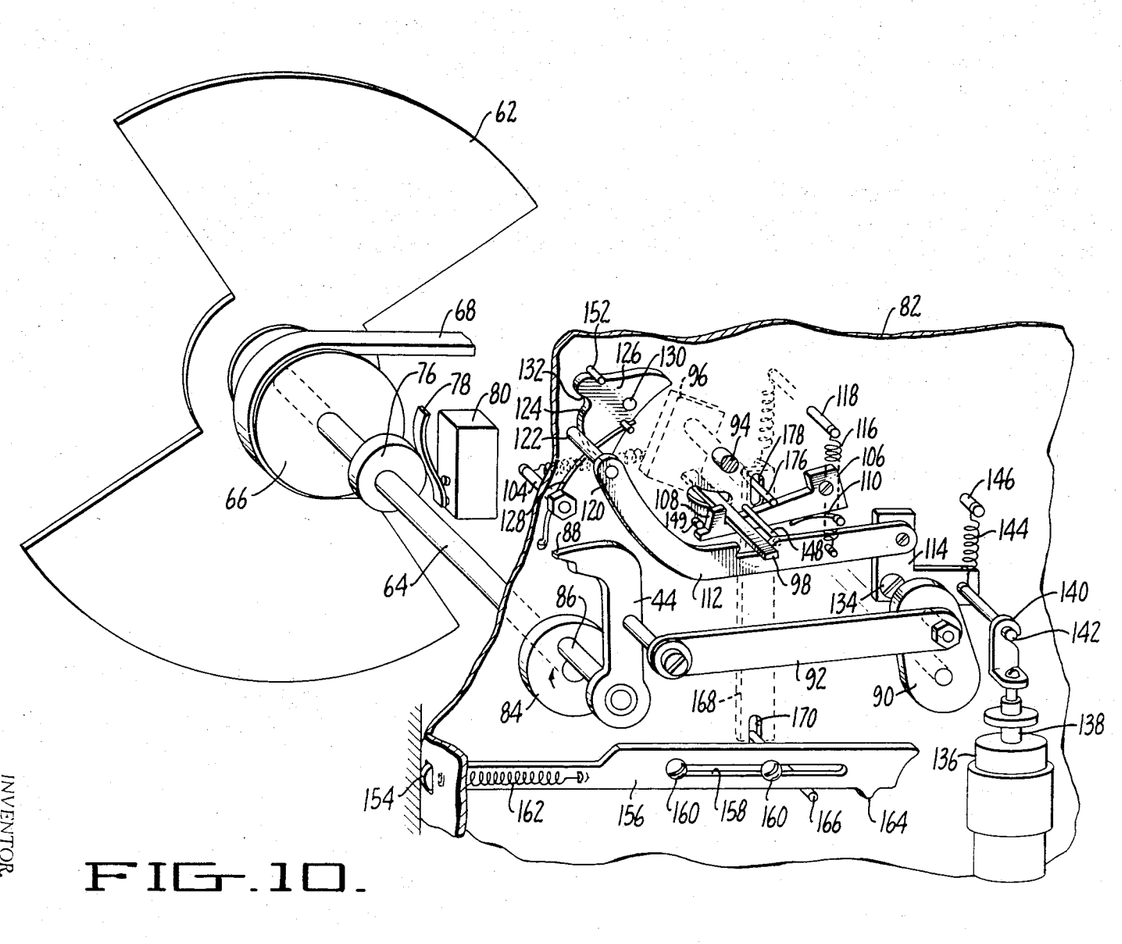
FIG. 10 is enlarged perspective view, partly in section, showing the shutter for the projection device and the details of the film advancing mechanism.
Figure 11:
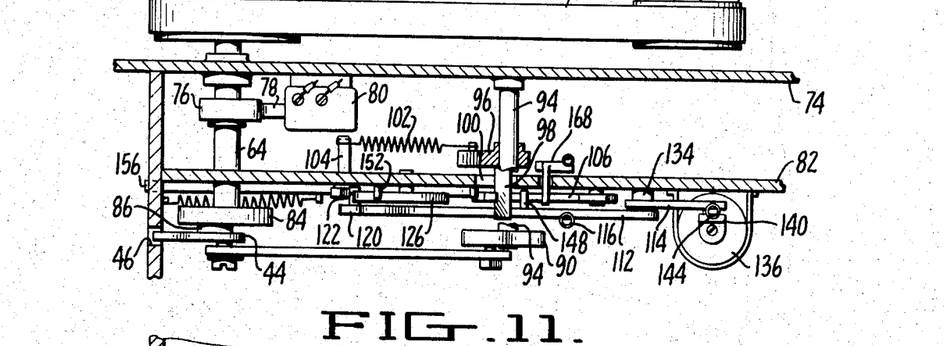
FIG. 11 is a sectional view taken along the line XI-XI in FIG. 3 looking in the direction of the arrows.
Figure 12:
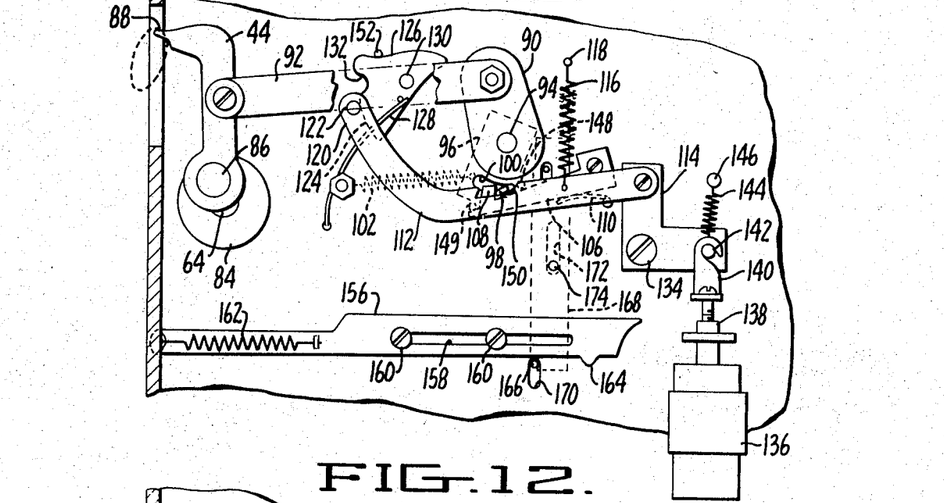
FIG. 12 is a sectional view taken along the line XII-XII in FIG. 8 looking in the direction of the arrows and showing the film advancing claw at the top of its stroke in a film engaging position.

Reference will first be had to FIGS. 10, 11 and 12. As seen there, the film advancing claw 44 is connected to an outer pivotable lug 90 by a control arm or lever 92. THe connection of the control arm 92 with the film advancing claw 44 occurs at a point intermediate the stud shaft 86 and the point 88 of the claw 44 so that lateral movement of the control arm 92 will cause pivotal movement of the claw about the stud shaft. The outer pivotable lug 90 is fixed on a short intermediate shaft 94 that extends between the outer wall 74 of the housing 12 and the intermediate wall 82 for the film advancing mechanism 42. A similar inner pivotable lug 96 is fixed to the shaft 74 on the opposite side of the intermediate wall 82 and has a laterally extending latch member 98 which extends through and beyond an elongated opening 100 formed in the wall 82. A spring 102 connects the inner lug 96 to a post 104 on the inner side of the wall 82 and exerts a constant force upon the lug 96 that tends to rotate the inner lug 96, the intermediate shaft 94 and the outer pivotable lug 90 in a clockwise direction (as viewed in FIG. 12).

The latch 98 is normally engaged by a keeper 106. The keeper 106 comprises a pivotable lever with an upstanding lug 108 formed adjacent the outer end. A leaf spring 110 biases the lever 106 formed adjacent in a latching or clockwise direction as viewed in FIG. 12. When so biased the upstanding lug 108 on the keeper 106 engages the front edge of the latch 98 on the inner pivotable lug 96 so as to prevent clockwise movement of the latch 98 and the inner and outer pivotable lugs 96 and 90 respectively.

A curved cocking arm 112 is provided for the purpose of controlling the pivotal movement of the inner and outer lugs 96 and 90. At one end the arm 112 is pivotally connected to a crank arm 114. The arm 112 is constantly biased in a clockwise direction by a spring 116 interconnected between the arm 112 and a post 118 on the intermediate wall 82. The outer end 120 of the curved cocking arm 112 carries a laterally extending pin 122 which engages the outer surface 124 of a control cam 126. A spring 128 on the wall engages the control cam 126 and constantly urges the cam, which is pivotally mounted on a short stub shaft 130 in the wall 82, in a clockwise direction as viewed in FIG. 12. The control surface 124 on the cam 126 terminates in a notch 132 which is adapted to receive the pin 122 on the cocking arm 112 but in the position of the parts as shown in FIG. 12 the pin 122 on the cocking arm 112 lies outside of the notch 132. Movement of the crank arm 114 about the pivot point 134 results from the actuation of a solenoid 136. The armature 138 of the solenoid 136 is provided with a hook 140 that engages a pin 142 on the crank 114 so that upon actuation of the solenoid the downward contraction of the armature 138 into the solenoid 136 pivots the crank arm 114 in a clockwise direction (as viewed in FIG. 12). A spring 144 engages the pin 142 on the crank 114 and a post 146 on the intermediate 82 wall and urges the crank arm 114 in a counterclockwise direction.

Figure 13:
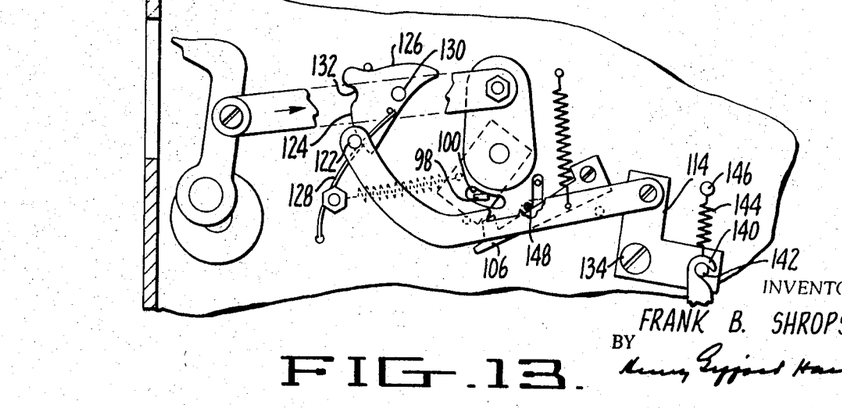
FIG. 13 is a view similar to FIG. 12 showing the disengagement of the film advancing claw from the film.
Figure 14:
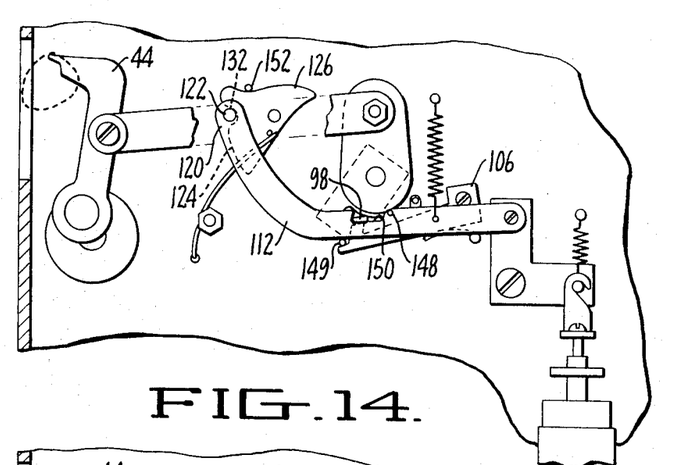
FIG. 14 is a view similar to FIG. 13 showing the film advancing mechanism set up to engage the film advancing claw with the film upon receipt of the next incoming control pulse.
Figure 15:
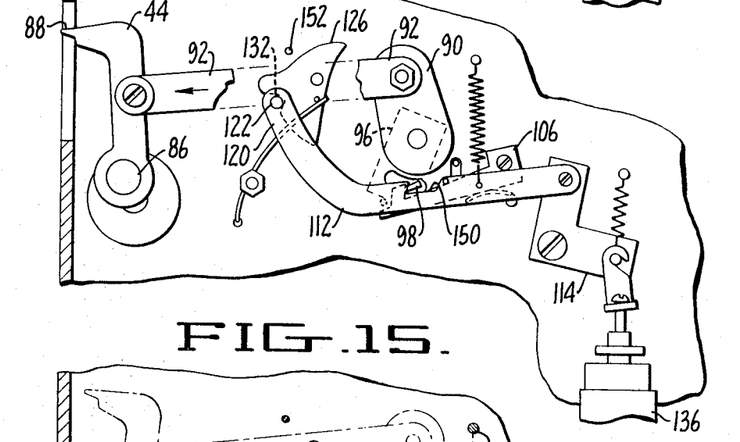
FIG. 15 is a view similar to FIG. 13 showing the film advancing claw being engaged with the film after receipt of a control pulse.
Figure 16:
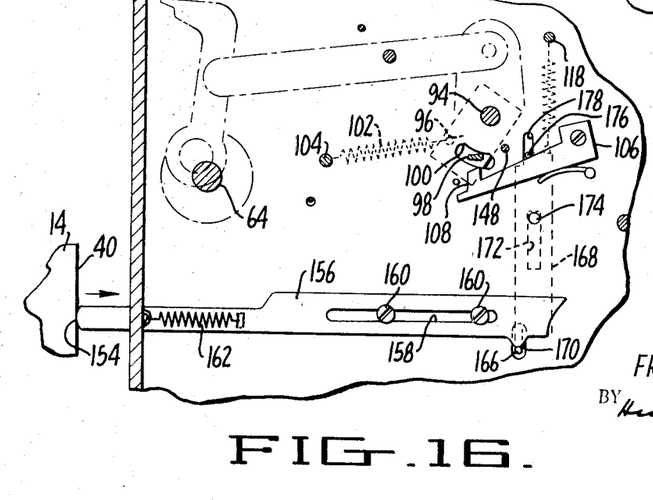
FIG. 16 is a view similar to FIG. 13 showing the manner in which the film advancing mechanism is placed in a non film engaging position upon insertion of the film cartridge into the audiovisual projection device.

Pivotal movement of the crank arm 114 in the clockwise direction pulls the cocking arm 112 to the right as viewed in FIG. 13. The pin 122 at the free end of the cocking arm 112 guides the motion of the arm 112 as it rides on the control surface 124 of the cam 126 and directs the arm in an arcuate movement defined by the control surface. A short inwardly extending pin 148 is provided on the cocking arm 112 and the pin 148 overlies the keeper 106 for the latch 98. As the crank arm 114 pivots in a clockwise direction and the cocking arm 112 moves in its arc, the pin 148 engages the upper surface of the keeper 106 and depresses the keeper 106 downwardly in a counterclockwise direction out of engagement with the latch 98 on the inner pivotable lug 96. THe inner pivotable lug 96 is thereby freed from restraint and moves in a clockwise direction under the urging of the spring 102. The outer pivotable lug 90 also moves in a clockwise direction and this causes the control arm or lever 92 to more to the right as viewed in FIG. 13. As the control arm 92 moves to the right the film advancing claw 44 is pivoted slightly in a clockwise direction. The slight pivotal movement, which is on the order of one-sixteenth of an inch, is sufficient to remove the point 88 of the claw 44 from engagement with the perforations 48 in the film as indicated in FIG. 14.

When the solenoid 136 is deenergized the crank arm 114 returns to its normal position under the urging of the spring 144. The counterclockwise movement of the crank arm 114 moves the pin 122 at the outer end 120 of the cocking arm 112 upwardly along the control surface 124 of the cam 126. Since the latch 98 on the inner pivotable lug 96 has now moved in a clockwise direction the cocking arm 112 is able to move to a higher position than was possible in FIG. 12. The pin 122 on the end 120 of the cocking arm 112 therefore slides along the control surface 124 of the cam 126 onto the notch 132 formed therein. The keeper 106 for the latch 98 also moves in a clockwise direction but its travel is limited by a stop 149 on the wall 82 which engages the outer end thereof and retains the keeper 106 just below and out of engagement with the latch 98.

Upon the next actuation of the solenoid 136 (shown in FIG. 15) the crank arm 114 is again pivoted in a clockwise direction. The clockwise pivoting of the crank arm 114 pulls the cocking arm 112 downwardly. Since the pin 122 on the free end 120 of the cocking arm 112 is engaged with the notch 132 on the cam 126 the downward movement of the cocking arm 112 also pivots the cam 126. The movement of the cocking arm 112 also causes the edge of the notch 150 formed in the cocking arm 112 to engage the front edge of the latch 98 on the inner pivotable lug 96. As the crank arm 114 moves in a clockwise direction, the cocking arm 112 follows the crank arm movement and moves the latch 98 in a counterclockwise direction. The counterclockwise movement of the latch 98 moves the inner and outer pivotable lugs 96 and 90 in a counterclockwise direction, forcing the control arm or lever 92 to move toward the left as viewed in FIG. 15. The leftward movement of the control arm or lever 92 causes the film advancing claw 44 to pivot about the stud shaft 86 and to cause the point 88 of the claw to follow a path which results in engagement of the point of the claw with the perforations in the film.

As the cam 126 is pivoted in a counterclockwise direction by the pin 122 in the notch 132, a point will be reached where the pin 122 will slip out of the notch 132, releasing the cam 126 and thereby allowing it to pivot in a clockwise direction back to its normal position against the stop 152 on the mounting wall. The cocking arm 112 will not be able to move upwardly a sufficient distance to permit the pin 122 to again engage the notch 132 due to the fact that the latch 98 on the inner pivotable lug 96 will engage the bottom of the notch 150 in the cocking arm 112 and prevent this (see FIG. 12). The keeper 106 for the latch 98 has, upon the retraction of the latch by the cocking arm, moved in a counterclockwise direction upwardly to hold the latch 98 in the position shown in FIG. 12. The cocking arm 112 is then placed in a position where, upon the next actuation of the solenoid 136, it will move in a direction that will depress the keeper 106, release the latch 98 and permit the latch to pivot in a counterclockwise direction so as to repeat the cycle of events as previously described.

Provision is made to insure that at the start of every showing of the film, particularly where the film is contained in a cartridge, the film advancing mechanism 42 is in a nonoperative condition with the film advancing claw 44 out of engagement with the film 32. The insertion of a cartridge 14 into the cartridge housing 16 automatically brings the front face 40 of the cartridge into engagement with the end 154 of a trip rod 156 mounted on the intermediate wall 82 in the housing 22 for the film advancing mechanism 42. The trip rod 156 is mounted for slidable movement and has an elongated slot 158 that rides on a pair of guides 160 fixed on the wall 82. A spring 162 biases the rod 156 in a leftwardly direction (as viewed in FIG. 16) so that the end 154 of the rod 156 extends into the area occupied by the cartridge 14 after insertion into the cartridge housing 16. Accordingly, as the cartridge 14 is inserted it first engages, and then moves, the trip rod 156 to the right. Rightward movement of the rod 156 causes a cam lobe 164 formed on the bottom edge of the rod 156 to engage and then depress a pin 166. The pin 166 is fixed to a slide 168 mounted on the opposite or interior side of the intermediate wall 82 and extends through an opening 170 in the wall 82 in the path of the cam lobe 164 on the trip rod 156. The slide 168 has an elongated slot 172 which rides on a guide 174. When the pin 166 is depressed by the cam lobe 164 the slide 168 moves downwardly and an upper pin 176, which also extends through an opening 178 in the intermediate wall 82, engages and depresses the keeper 106 for the latch 98 on the inner pivotal lug 96. With the latch 98 released the lug 96 is free to rotate in a clockwise direction and to cause the control arm 92 to pivot the film advancing claw 44 out of its film engaging position as heretofore described. In this way insertion of the film cartridge 14 into its holder 16 always acts to set the film advancing mechanism 42 into a nonoperative condition at the beginning of the subject.

The operation of the device is as follows: The power for the device is first turned on by operation of the on-off switch 180 on the outside of the housing 12 before the film cartridge 14 is inserted into the cartridge housing 16. This will energize the motor 72 and start the shutter 62 and film advancing claw 44 rotating. Insertion of the film cartridge 14 actuates the trip rod 156 and causes the film advancing claw 44 to be pivoted to a nonfilm-engaging position. The magnetic tape 182 is then inserted in the tape transport 184. As the tape is passed through the pickup heads 186 it assumes control over the film advancement. The tape has two tracks. One track carries the audible part of the subject while the second track carries the film controlling pulses. Since the film and its corresponding sound track on tape are both in continuous cartridges and have an identifiable starting point marked on each, they are both inserted in this position to assure accurate synchronization.

The first pulse on the tap e will cause the film advancing mechanism 42 to engage the film 32. First the pulse passes to an amplifier 188 where its amplitude is increased. From the amplifier 188 the pulse goes to a flip-flop circuit 190. The flip-flop circuit 190 controls the power to a relay 192 in the solenoid circuit. Upon receiving the pulse from the tape the flip-flop circuit 190 energizes the relay 192. The relay 192 in turn actuates the solenoid 136 by closing a switch in the solenoid circuit. Energizing the solenoid 136 pulls down the armature 138, pivots the crank arm 114 and causes the cocking arm 112 to pivot the latch 98 and the pivotal lugs 96 and 90 in a counterclockwise direction as previously described. Movement of the outer pivotal lug 90 in a counterclockwise direction moves the control arm 92 leftwardly and pivots the film advancing claw 44 into a film engaging position. The claw 44 then engages the film in the cartridge and advances the film in rapid or motion picture sequence.

The cam 76 on the shaft 64 for the shutter 62 is designed to contact the cam follower 78 and close the microswitch 80 during approximately 80° of rotation of each revolution of the shaft 64. Actuation of the microswitch 80 deenergizes the relay 192 and opens the switch in the solenoid circuit. When the solenoid 136 is deenergized the spring 144 returns the crank arm 114 to its normal position. Return of the crank arm 114 to its normal position does not cause the film advancing claw 44 to disengage from the film. It merely sets up the film advancing mechanism 42 to disengage the film advancing claw 44 upon the next incoming pulse from the tape.

The period during which the microswitch 80 is closed is designed to coincide with the period when the film advancing claw 44 is engaging the film and the shutter leaf is blocking the projection lamp 54. Deenergizing the relay 192 during these periods makes it impossible for an incoming pulse to cause the claw 44 to disengage from the film before it has fully advanced.

In preparing a film unit and its corresponding sound track, standard editing procedures are used. The audible portion of the sound track is prepared on optical or magnetic sprocketed film to run at standard motion picture speed of 24 frames per second.

It is then matched to the image film, taking into account the fact that while the sound track will be running at standard motion picture speed, some frame s of film in the image will be held in the aperture of the projector. The editor can note where he wants the film to run consecutively at the same speed as the sound track and where he wants the film to hold in the aperture and mark this accordingly on the sound track.

A second parallel track is now prepared on sprocketed material exactly the same length and duration as the audible track. When these two tracks are put through a mechanical synchronizer, the editor can insert the required pulses opposite his marks on the audible track.

The pulse track and the audible track are now run simultaneously and recorded on a dual track one-fourth inch tape. This tape is now the master sound track for that particular film unit, and like the film, can be reproduced by film and recording laboratories in volume with the equipment presently in common usage today.

Each pulse on the tape has a time duration (one twenty-fourth of a second) corresponding to that required for one revolution of the shutter shaft 64. Inasmuch as the microswitch 80 grounds out the relay 192 for approximately 80° of rotation of the shutter shaft 64, there remains approximately 280° of rotation available, for the actuation of the relay 192 and solenoid 136. This arrangement insures that the pulse from the tape will always trip the film advancing mechanism 42 on the exact film frame desired or at least within one film frame of it. If the start of the pulse is received sufficiently in advance of the 80° relay blackout period the film advancing mechanism 42 will be actuated before the concurrent working stroke of the film advancing claw and the claw will be engaged or withdrawn from the film at the desired time. If the start of the pulse is late and is not received before the start of the claw's working stroke or, if received before the start of the working stroke, is received insufficiently early, the working stroke of the claw will not be changed and the claw will either remain engaged or disengaged from the film as the case may be. However, during the subsequent available 280° period the continuing pulse will actuate the relay 192 and solenoid 136 and the film advancing mechanism 42 will engage or disengage the claw 44 as desired prior to its next working stroke. Thus, synchronization of the tape with the film is always within one film frame and this is more than sufficient. Even when the sound is off the visual action by one film frame, the effect is not discernible to the viewer. At this degree of synchronization even lip movements appear synchronized with the sound. The high degree of synchronization achieved by the invention makes it possible to insure that with only three film frames of any given nonaction scene the film will always be stopped in a position to repeatedly project that scene for a protracted period as called for by the signals on the tape.

The use of magnetic tape makes it unnecessary to put a sound track onto the film. This further reduces the cost of reproducing the visual image, as well as assuring a better quality of sound reproduction, than can be achieved on film. This unique feature of this invention enabling it to use separate visual and audio units, perfectly synchronized, introduces further economies in the cost of the materials it uses. A single visual unit may be used with several different sound tracks, each prepared for the different levels of teaching or training, as the subject may demand. Its potential is even greater in the field of multiple languages, where a single visual unit can be matched with sound tracks in numerous languages.

Figure 17:
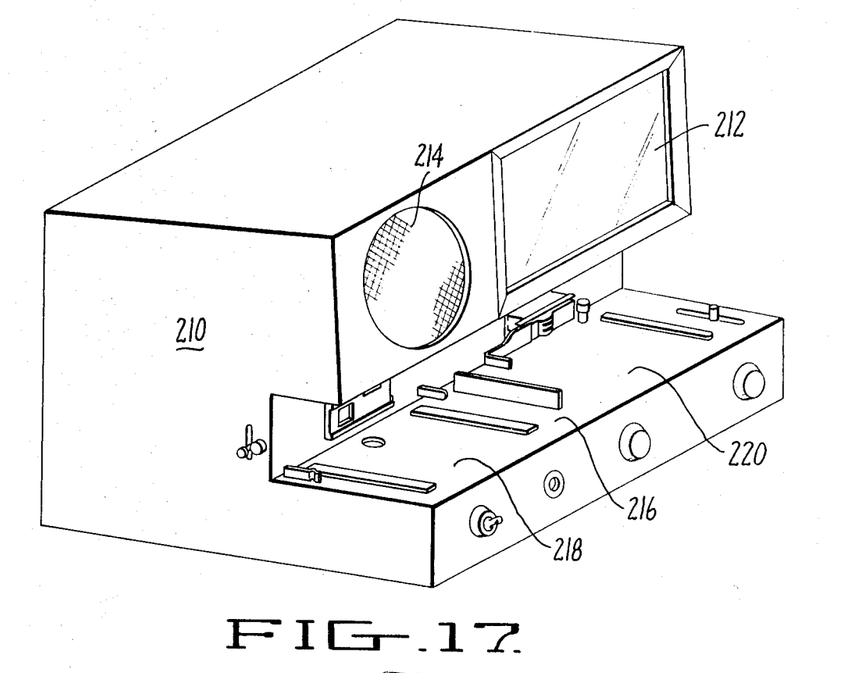
FIG. 17 is an external perspective view of modified audiovisual projection device containing a small integral screen upon which the film is adapted to be projected.
Figure 18:
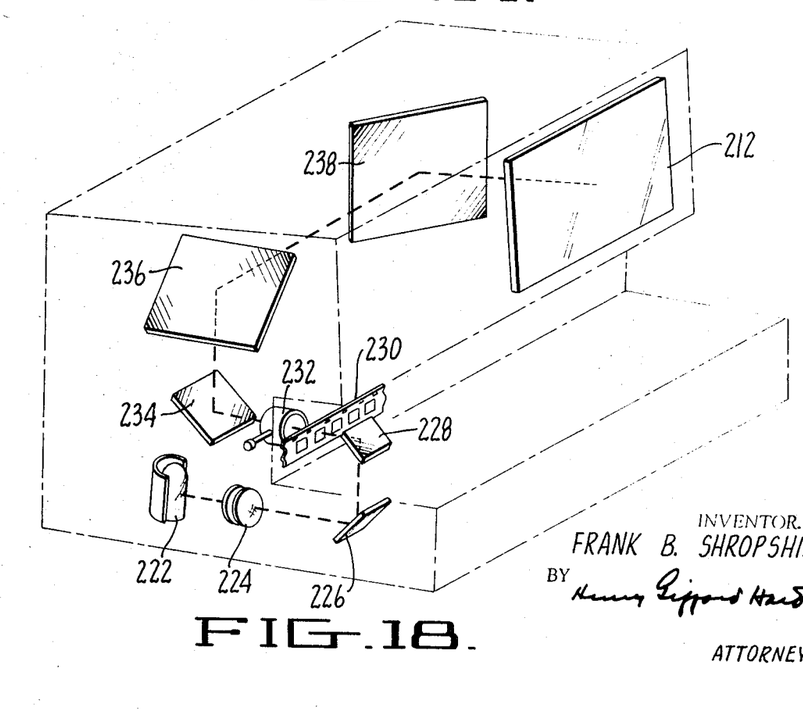
FIG. 18 is a view similar to FIG. 17 showing the lens and mirror system of the modified form of the invention.

The embodiment of the invention just described the visual part of the subject was projected onto a screen spaced from the device. The invention lends itself to an entirely self-contained unit in which the viewing screen is integral with the device. Such an embodiment is shown in FIGS. 17 and 18. There the film cartridge and projection system have been disposed horizontally on the housing 210. The housing 210 for the device has a small viewing screen 212 and a loudspeaker 214 in the upper section thereof. A deck 216 is provided adapted to receive tape cartridge at 218 and a film cartridge at 220. The optical system for projecting the film onto the screen is shown in FIG. 18. As indicated the light passes from the projection lamp 222, through the condensing and heat shielding lenses 224, and is deflected upwardly by the first mirror 226. The light is deflected again by a mirror 228 in the film cartridge (not shown) , through the film 230, the focusing lens 232 and then from the mirrors 234, 236 and 238 to the screen 212.

It will be readily appreciated by those skilled in the art that the film advancing scheme of the present invention is independent of the particular means for signaling and controlling the engagement and disengagement of the film advancing claw from the film. Other mechanisms and signal means could be employed as well and the film advancing scheme could be incorporated into present projection devices with only slight modification.

I claim:

1. An audiovisual projection device for reproducing synchronous sound and still and motion picture frames in sequence from the same strip of film, in combination a projection system having a light source and a continuously revolving shutter for interrupting the light source, a constant speed motor for continuously rotating the shaft mounting said shutter at 24 r.p.s., a strip of film for projection having multiple sequential frames arranged for motion picture sequence and still sequence as required, a two track magnetic tape having one track for the audio sequence and the other track for recorded predetermined signals for controlling the advancement of said film, separate electrically operated film claw advancing means comprising a film advancing claw pivotally mounted on a rotatable bellcrank and a control lever pivotally connecting said claw to electrical signals means, said control lever being moved in response to said recorded signals to pivot said film advancing claw about said bellcrank to engage and disengage said claw, said film advancing claw means being driven by said motor shaft for continuous rotation at the same time and speed as said shutter and eccentric cam means also mounted on said shaft for grounding out said relay means for 80° of one rotation thereby assuring the engagement or release of said claw means at the exact frame desired.

2. The audiovisual projection device of claim 1 where the strip of film is continuous and contained within a cassette.

3. The audiovisual projection device of claim 1 wherein the strip of film has marginal perforations with which the continuously operating film advancing claw engages.

4. The audiovisual projection device of claim 1 wherein the continuously operating film advancing claw alternately engages and disengages said strip of film in response to the continuous sequence of the said recorded signals.